United States Patent
Manlay (10) Patent No.: US 9,140,534 B2
(45) Date of Patent: Sep. 22, 2015

(54) TWO-DIMENSIONAL METROLOGICAL CALIBRATION STANDARD

(71) Applicant: Commissariat A L'Energie Atomique et Aux Energies Alternatives, Paris (FR)

(72) Inventor: Jean-Francois Manlay, Cahors (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 205 days.

(21) Appl. No.: 14/059,864

(22) Filed: Oct. 22, 2013

(65) Prior Publication Data

US 2014/0109646 A1   Apr. 24, 2014

(30) Foreign Application Priority Data

Oct. 24, 2012   (FR) ...................................... 12 60107

(51) Int. Cl.
*G01B 21/04* (2006.01)
*G01B 5/24* (2006.01)
*G01B 5/02* (2006.01)

(52) U.S. Cl.
CPC .. *G01B 5/24* (2013.01); *G01B 5/02* (2013.01); *G01B 21/042* (2013.01)

(58) Field of Classification Search
CPC ........ G01B 21/042; G01B 3/30; G01B 5/008; G01B 11/005; G01B 21/02; G01B 21/04; G01B 21/045; G01B 2210/303
See application file for complete search history.

(56) References Cited

U.S. PATENT DOCUMENTS

| 3,992,005 | A | * | 11/1976 | Richey .............................. 473/40 |
| 4,536,995 | A | * | 8/1985 | Frederick ........................... 52/27 |
| 4,763,507 | A | * | 8/1988 | Zofchak .......................... 73/1.81 |
| 4,932,136 | A | * | 6/1990 | Schmitz et al. ................. 33/502 |
| 5,269,067 | A | | 12/1993 | Waeldele |
| 5,313,410 | A | * | 5/1994 | Watts .............................. 702/95 |
| 5,604,593 | A | * | 2/1997 | McMurtry .................... 356/496 |
| 5,681,981 | A | | 10/1997 | McMurtry |
| 5,756,886 | A | * | 5/1998 | Nishimura et al. ............. 73/105 |
| 5,813,287 | A | * | 9/1998 | McMurtry et al. ......... 74/490.06 |
| 5,906,461 | A | * | 5/1999 | Lunz et al. .................... 409/201 |
| 6,108,497 | A | * | 8/2000 | Nakayama et al. ........... 396/429 |

(Continued)

FOREIGN PATENT DOCUMENTS

JP    2006-329694 A    12/2006
WO    WO 91/03706 A1    3/1991

OTHER PUBLICATIONS

Search Report from French Application No. 1260107, dated Mar. 8, 2013, 2 pages.

*Primary Examiner* — David A Rogers
(74) *Attorney, Agent, or Firm* — Brinks Gilson & Lione (57) ABSTRACT

A two dimensional metrological calibration standard includes a plurality of calibration cylinders each having a diameter and a plurality of calibration gauge blocks each having a length, each calibration gauge block being interposed between two of the calibration cylinders, such that end faces thereof are in contact with the walls of adjacent calibration cylinders, the calibration cylinders and calibration gauge blocks as a group are fastened to a flat plate and conjointly form a triangle. Bearing and alignment rulers ensure alignment of the calibration gauge blocks between the calibration cylinders, by contact with the calibration gauge blocks and/or the calibration cylinders, and are fastened to the plate.

6 Claims, 3 Drawing Sheets

(56) References Cited

U.S. PATENT DOCUMENTS

| | | | |
|---|---|---|---|
| 6,493,956 B1* | 12/2002 | Matsuda | 33/502 |
| 6,493,957 B1* | 12/2002 | Takatsuji et al. | 33/502 |
| 6,497,134 B1* | 12/2002 | Faul et al. | 73/1.81 |
| 6,505,495 B1* | 1/2003 | Blondeau | 73/1.79 |
| 7,043,961 B2* | 5/2006 | Pandey et al. | 73/1.81 |
| 7,788,965 B2* | 9/2010 | Arnold et al. | 73/9 |
| 7,810,248 B2* | 10/2010 | McMurtry | 33/503 |
| 2003/0056566 A1* | 3/2003 | Nashiki et al. | 73/1.79 |
| 2003/0070311 A1* | 4/2003 | Zhu et al. | 33/502 |
| 2004/0066508 A1 | 4/2004 | Schmadel | |
| 2005/0159230 A1* | 7/2005 | Tudek | 473/40 |
| 2008/0113823 A1* | 5/2008 | Tudek et al. | 473/40 |
| 2009/0260243 A1* | 10/2009 | Evans et al. | 33/502 |
| 2011/0088271 A1* | 4/2011 | Bridges | 33/502 |
| 2013/0232803 A1* | 9/2013 | Romanelli | 33/503 |
| 2014/0083161 A1* | 3/2014 | Pucnik et al. | 73/1.79 |

* cited by examiner

TWO-DIMENSIONAL METROLOGICAL CALIBRATION STANDARD

RELATED APPLICATIONS

This application claims the benefit of French Patent Application No. FR 1260107 filed Oct. 24, 2012, the entire disclosure of which is incorporated herein.

BACKGROUND

1. Technical Field

The field of application of this invention mainly concerns the metrological verification and the calibration of multi-dimensional measuring instruments such as three-dimensional measuring machines, without or without contact, machines with a rotary table, poly-articulated arms, and such as laser tracker type apparatuses and theodolites. The invention concerns a two-dimensional metrology standard, that is to say a calibration standard capable of serving as a metrological reference for coplanar lengths (non-parallel) and/or angles (non-zero).

2. Description of the Related Art

The geometry of a multi-dimensional measuring machine is generally verified on the basis of one-dimensional calibration standards of calibration gauge block or stepped block type, placed in different positions in the measuring space. The ISO-10360 series of standards sets a certain number of distance measurements (referred to as sizes) in different positions to verify that the maximum measurement discrepancy is less than a manufacturer's specification. This procedure is very costly in time and in number of calibration standards, and above all only enables partial verification of geometry. If it is desired to measure geometry more fully, it is necessary to provide a multiplicity of positions for the blocks, or employ an interferometer and electronic levels.

In order to simplify the process of verifying a multi-dimensional measuring machine, certain assemblies of one-dimensional calibration standards have been produced. They thus enable the geometry of the machine to be tracked by monitoring the drifts relative to an initial measurement, but these assemblies do not associate the dimensions together in the metrological sense (see the document JP-3427376 or the document US-2009/0082986, or the device called "KOBAcheck sphere plate" of Kolb & Baumann GmbH & Co KG or that called "CMM Check" by Carl Zeiss Messtechnik GmbH). In fact, these assemblies only have the advantage of avoiding the operator having to dispose the various one-dimensional calibration standards in the measuring space himself. Yet the relative dimensions between the individual one-dimensional calibration standards do not enable lengths and angles to be linked in the metrological sense. At best, such assemblies are characterized on measuring machines considered to be more precise than those on which they will be used. These items of equipment enable tracking of the change in the machine over time, using control charts, for example, but do not enable the parameter of the geometry that has fluctuated to be defined, in case of drift.

SUMMARY

In dimensional metrology, there are no two- or three-dimensional calibration standards in existence that can be directly linked to the definition of the meter. All the known calibration standards are one-dimensional, that is to say that they only constitute a metrological reference in one direction, or for a one-dimensional value (in the case of a cylinder). This is particularly disadvantageous for the verification of multi-dimensional measuring machines.

The object of the invention is to produce, from one-dimensional calibration standards, a two-dimensional calibration standard, that is to say a metrological calibration standard in at least two directions of a plane, so as to enable, in particular, measurement not only of distances but also of angles, for the purposes of calibration.

To that end the invention provides for the constitution of a triangle of which the vertices and the angles are accessible to measurement and of which the dimensions are linked to the definition of the meter with limited uncertainties.

It is to be recalled that the fact of stating that the dimensions are "linked to the definition of the meter" means that the chain of comparisons that enabled production of the calibration standard used is uninterrupted and traced to the actual reference of the physical quantity, and that the associated uncertainties have been determined. The invention is constituted by a triangle the vertices of which are each represented by the center of a circle measured on a calibration cylinder of given height. The spacing between the cylinders is defined by calibration gauge blocks. The assembly is fastened to a plate the flatness of which has been calibrated. Thus, the invention employs several elements that are known per se; calibration cylinders, of which the diameter and the shape defect have been calibrated, calibrated calibration gauge blocks, and a plate the flatness of which has also been calibrated. The various aforesaid elements are aligned and the contacts are ensured; the application of the rules of trigonometry is thus valid.

More specifically, the invention provides a two-dimensional metrological calibration standard comprising a plurality of three calibration cylinders each having a known diameter and a plurality of the same number of calibration gauge blocks each having a known length, each calibration gauge block being interposed between two of the calibration cylinders such that its end faces are in contact with the walls of said two calibration cylinders, the calibration cylinders and calibration gauge blocks as a group being fastened to a flat plate and conjointly forming a triangle, each cylinder having a diameter at most equal to twice the width of the calibration gauge blocks in contact with which it is placed, bearing and alignment rulers extending alongside the calibration gauge blocks and the calibration cylinders and being fastened to the plate.

In the context of the invention, the concept of bearing and alignment ruler, referred to equally well below as bearing ruler or alignment ruler, designates an instrument having at least one flat face by which that instrument extends along the plate and a flat face (perpendicular to the first face) by which that instrument provides the function of bearing and alignment; the outer surface of the instrument not including those two faces may be of any nature, said instrument having for example a cross-section that is rectangular or triangular or a quarter circle, uniform or not uniform between its ends.

On account of such an assembly defining a triangle (flat geometric figure), the two-dimensional calibration standard enables the verification of dimensions in different directions, as well as the verification of angles (non-zero).

As indicated, each cylinder must have a radius less than the width (measured parallel to the plate) of each calibration gauge block with which it is in contact (this width is in practice standardized) so as to ensure that the contact of the cylinder on the block is made on the measurement face thereof (see below) when the cylinder also bears on the alignment ruler.

The calibration cylinders advantageously have equal nominal diameters, so as to simplify the trigonometric calculations.

The advantage of this calibration standard further comprising alignment rulers is that this makes it possible to make the straight line passing through the centers of the circles (cross-section of the cylinders) coincide with the direction of measurement of the block, while furthermore ensuring a degree of rigidity of the final assembly.

The calibration gauge blocks preferably have equal widths parallel to the plate (most often these are standardized widths).

The calibration cylinders and the calibration gauge blocks are fastened to the plate by means of clamping members passing through those calibration cylinders and those calibration gauge blocks advantageously with clearance; they may thus be clamping screws screwed into the plate; as a variant these fastening members may be bolts passing through those elementary calibration standards and the plate with clearance; these clearances contribute to facilitating the assembly of the various elements, but are eliminated after fastening (in practice by clamping).

Of course, as the shape of the calibration standard is triangular, is advantageous for the support plate of the calibration standard to be triangular also (possibly with corners cut off) in order to limit the mass of the assembly.

Advantageously, that plate is provided with at least one handle, which facilitates manipulation thereof; nevertheless, that plate must possess one side capable of being placed on its edge surface in cases where it is provided for the two-dimensional calibration standard to be used for the calibration in three dimensions of a three-dimensional measuring machine.

BRIEF DESCRIPTION OF THE DRAWING

Objects, features and advantages of the invention are apparent from the following description, given by way of illustrative non-limiting example with reference to the accompanying drawings in which.

DETAILED DESCRIPTION

Figure 1:
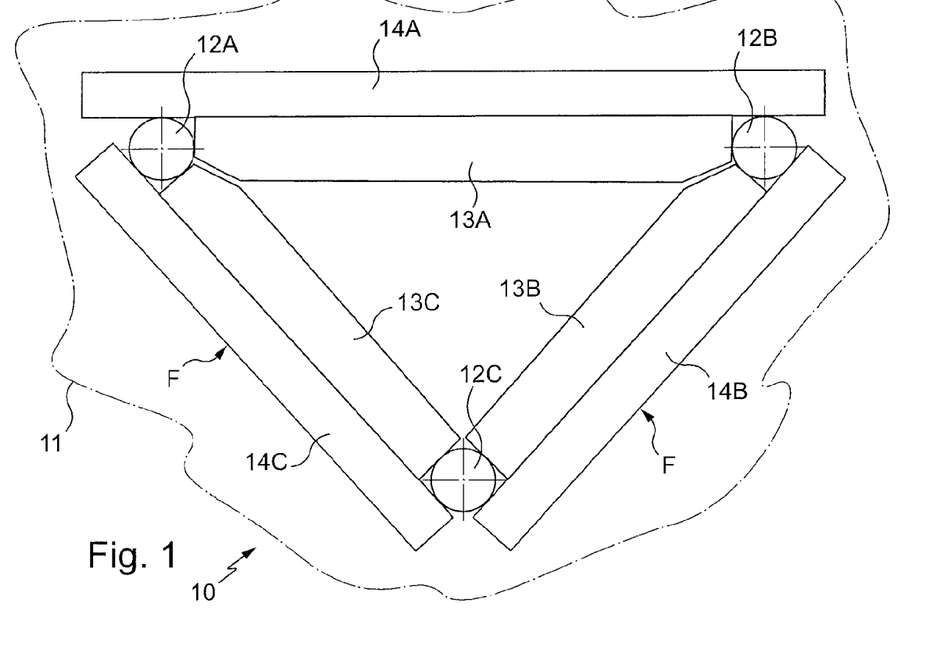
FIG. 1 is a diagram of a two-dimensional metrological calibration standard in accordance with the invention.

FIG. 1 is a diagrammatic representation of a two-dimensional metrological calibration standard in accordance with the invention, denoted by the overall reference 10. In this example embodiment, the calibration standard is of triangular general shape.

This calibration standard comprises elementary calibration standards and bearing and alignment rulers connected to a plate 11 by fastening members (not shown in this drawing); the elementary standards here comprise three calibration cylinders 12A, 12B and 12C and three calibration gauge blocks 13A, 13B and 13C; bearing rulers are equal in number to the calibration gauge blocks (and to the calibration cylinders), i.e. three, and are denoted 14A, 14B and 14C.

The calibration cylinders 12A and 12C constitute the vertices of a triangle of which the sides are constituted by the calibration gauge blocks 13A to 13C, of which each end comes into contact with the adjacent cylinder, by its measurement face (that is to say its end face or surface); each bearing ruler 14A, 14B or 14C is in contact with both a calibration gauge block and with each of the calibration cylinders between which that calibration gauge block is situated. The fact of establishing a contact between the measurement faces of a calibration gauge block and the walls of the adjacent calibration cylinders tends to produce a dimension ideally representing the sum of the elementary dimensions, with uncertainties, which may arise from possible defects of geometry, which will be analyzed later.

The one-dimensional calibration standards 12A to 12C, 13A to 13C, connected to the definition of the meter, are thus disposed in a triangle so as to be able to link distances and angles together; they thus make up a constituted two-dimensional calibration standard. Its uncertainties are calculated on the basis of the calibration uncertainties of each of the constituent elements. The calculation is based on the application of rules of trigonometry associated with the geometry of the triangle. For each of the sides of the triangle formed, the side length is determined by a composition of the radii of the two end cylinders, of the length of one calibration gauge block, and of the alignment of those three elements. This concept of alignment means here that the distance between the tangents to the cylinders is expressed along the normal to the measurement faces of the calibration gauge block.

It can be understood that the triangular shape is the simplest shape enabling dimensions and angles to be defined in a plane and thus is the simplest shape to form a two-dimensional calibration.

The calibration cylinders are preferably of equal diameter; still more advantageously, they have identical geometry (that is to say that they are furthermore of equal height).

When calibration cylinders are selected of which the diameter is substantially less than the width of a conventional calibration gauge block, it may be necessary to provide a chamfer next to the ends, as is apparent from FIG. 1, next to the calibration cylinders 12A and 12B (see also FIG. 3); this makes it possible to avoid contact between the calibration gauge blocks themselves, even when conjointly defining a very acute angle, while ensuring the tangency of each of them with the adjacent cylinder.

It is however possible to have calibration gauge blocks produced having a specific geometry (cylindrical or polygonal cross-section), the only constraint on the geometry being the possibility of calibrating the distance between the measurement faces so as to minimize the uncertainty in the length.

The fastening of the one-dimensional calibration standards and the bearing and alignment rulers to the plate is provided for example by bolts passing through bores in the calibration standards and in the plate with sufficient clearances to enable significant movement, typically of several millimeters, until those bolts have been tightened (after tightening, no further movement is possible); as a variant this fastening is provided by clamping screws passing through the bores of the blocks and standards with clearance, and cooperating with tapped bores formed in the plate, or in implants joined to the plate.

The plate is for example of a material of high rigidity and high dimensional stability, such as granite and the bores may be formed by tapped cylindrical implants bonded so as to be rigidly connected to the plate. Similarly the bearing rulers 14A to 14C are advantageously produced from a material similar to that of the plate, here granite.

Figure 2:
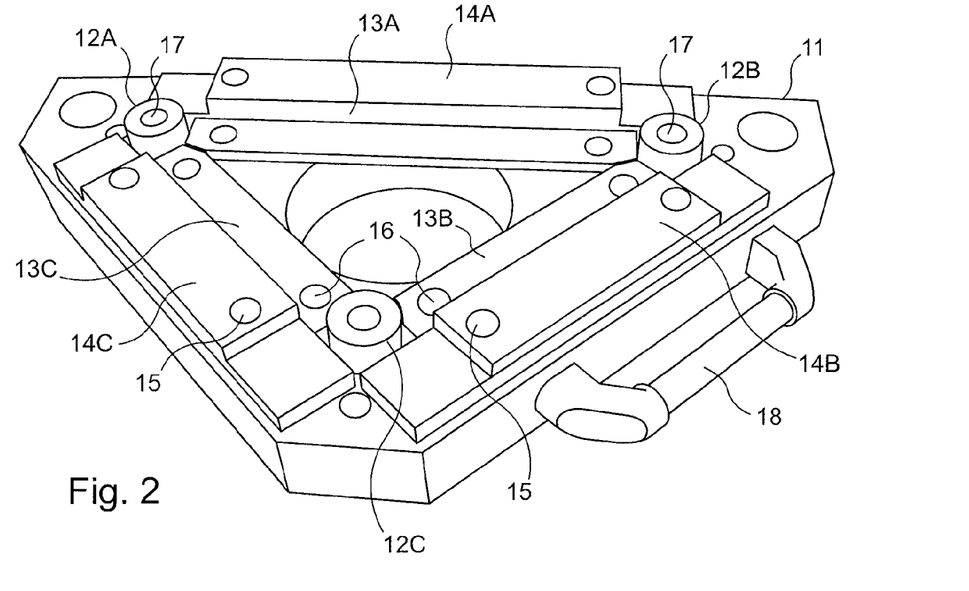
FIG. 2 is shows an example embodiment thereof in perspective.

It can thus be seen in FIG. 2 that the plate 11 is of triangular general shape with cut-off corners, that the bearing rulers 14A to 14C are each fastened to it by two clamping screws 15; similarly, each calibration gauge block is fastened to the plate by means of two screws 16 and the cylinders are each fastened to the plate by means of a screw 17.

In the example represented, the plate, and thus the entire two-dimensional calibration standard, is provided with at least one handle 18, adapted to facilitate its manipulation. In the example represented here, there are two handles, along two sides of the two-dimensional calibration standard; this leaves the third side free in order for the calibration standard to be placed vertically on a measuring machine table (for this it suffices for the plate to have a sufficiently thick side to enable such vertical placement).

Assembly of the One-Dimensional Calibration Standards

The assembly of the calibration standards 12A to 12C, 13A to 14C on the granite plate 11 must be carried out with care, in order not to generate deformation and to provide the different contacts. It must in particular be made after thermal stabilization of the constituent elements. In the case of use at variable temperature, the constituent materials must have expansion coefficients close to each other (for example not differing by more than 20%).

The assembly may be made in the following manner.

It commences by approximately placing all the elements and their clamping screws.

Figure 3:
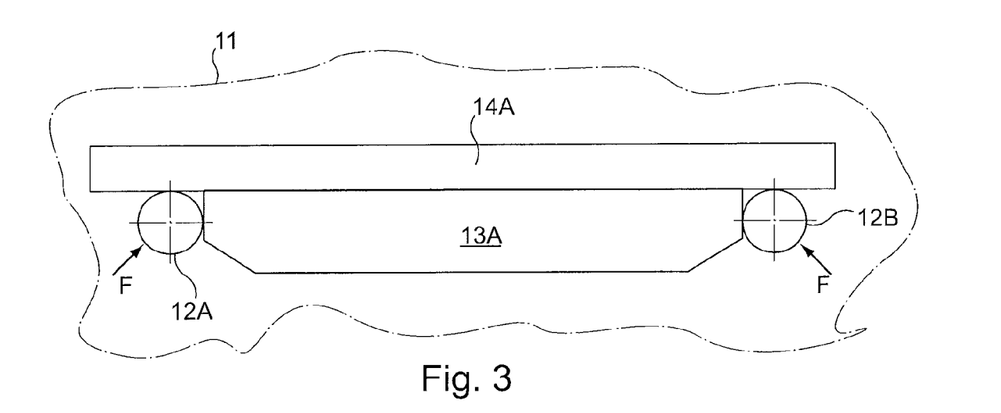
FIG. 3 is a diagram representing a first step of the method of mounting the calibration standard of FIG. 1.

Producing the final assembly commences with assembling one calibration gauge block and two cylinders along a granite ruler, and clamping each element (cf. FIG. 3, concerning block 13A, cylinders 12A and 12B and ruler 14A, but without the clamping means being represented).

To begin, the granite ruler 14A is joined to the plate, by tightening of the fastening means, next, also by clamping, the calibration gauge block 13A is joined to the plate after having ensured that it extends along the granite block with continuous contact; next the two cylinders are joined to the plate by clamping, one after the other. In order to ensure good contact between the cylinders and the block, the assembler must apply a slight force to each cylinder, in the direction of the arrows F (see FIG. 1).

It is possible, on account of the play with which the clamping screws are engaged in the bores of the cylinders, that those screws may not be concentric with those cylinders, but this does not hinder the metrological function of the final assembly.

The assembly continues with the placing in contact of the other two calibration gauge blocks 13B and 13C with the calibration cylinders 12A and 12B, and with the bearing rulers 14B and 14C, while ensuring that the blocks extend along those rulers with good contact; this placing in contact is made first of all without tightening of the clamping screws.

This step is relatively difficult, since it is necessary to put the 3rd cylinder into place while providing 4 points of contact (i.e. the contacts with the two blocks 13B and 13C and the rulers 14B and 14C), which may appear statically indeterminate, if the lower part of the cylinder (location of the contacts) is assimilated to a circle. The assembler applies a slight force to the granite blocks (arrows F), while ensuring the contact by the calibration gauge blocks with them. Provided that the contact is provided, the assembly performs the clamping of the cylinder 12C then the clamping of the granite blocks 14B and 14C, and possibly of the calibration gauge blocks (but this is not yet necessary, see below).

When the assembly has been thus assembled, it is checked (for example using a magnet and a lever probe), that the longitudinal play of the blocks is zero. If the blocks were clamped in the preceding step, that check is carried out after unclamping those blocks; they are clamped following that check; all the constituent elements of the two-dimensional calibration standard are then rigidly fastened to the plate, and thus to each other.

By way of example, a prototype forms an isosceles right triangle and comprises calibration cylinders of the same diameter (they are identical even, with equal height and are constituted from the same materials).

If the calibration gauge blocks have lengths denoted L1, for one of them, and L2, for the other two, whereas the radius of the cylinders is denoted R, these dimensions thus satisfy Pythagoras's theorem, that is to say that:

$$[L1+2R]^2 = 2 \times [L2+2R]^2$$

The possible diameters (D=2R) are thus:

$$D_1 = L_1(1-\sqrt{2}) + L_2(\sqrt{2}-2)$$

$$D_2 = L_1(1+\sqrt{2}) - L_2(\sqrt{2}+2)$$

In the case of the use of standard calibration gauge blocks, of width 35 mm, the selected diameter must thus be substantially less than 70 mm, in order to ensure radial contact (this expresses the aforementioned condition that the radius of the cylinders must be at most equal to the width of the blocks).

The machining of the corners of the calibration gauge blocks within the two-dimensional calibration standard must be envisioned according to the lengths and the diameters that are actually selected.

However, the use proposed for the flat plate (or support) is valid with any kind of triangle, whether it be a right triangle or not. The only remaining constraint is to adopt a cylinder diameter less than 70 mm, provided conventional calibration gauge blocks of 35 mm width are used.

A two-dimensional calibration standard may thus be envisioned having the form of an equilateral triangle; the condition whereby the radius of the calibration cylinders must, preferably, be less than the width of the blocks leads to the condition that the radius of the cylinders must be greater than 22.189 mm, while remaining less than 35 mm (i.e. the width of the conventional calibration gauge blocks) so as to avoid any contact between the blocks and the calibration cylinders. It can easily be understood that this is a particularly advantageous assembly, since it does not require any machining of the blocks, but also from the point of view of use (angles that are theoretically equal may thus be measured in different configurations).

For each of the sides of the triangle formed, the side length is given by a composition of the radii of the two end calibration cylinders, of the length of the calibration gauge block, and of the alignment of those three elements.

Figure 4:
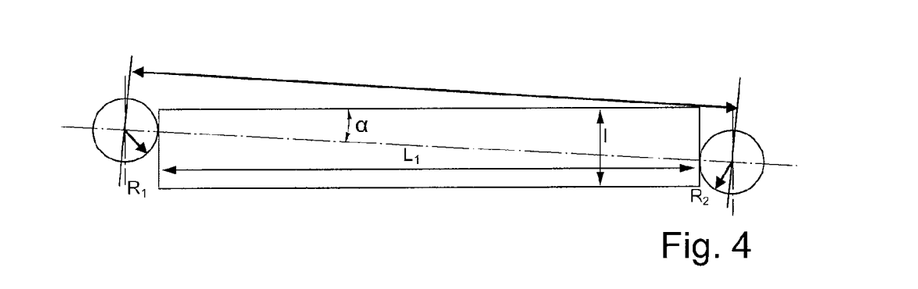
FIG. 4 is a diagram showing the error arising from an inclination (viewed from above) of a calibration gauge block relative to the line linking the centers of two respective cross-sections of two calibration cylinders separated by that calibration gauge block.

FIG. 4 represents the case in which the block has a longitudinal direction forming a non-zero angle α with the line passing through the centers of the cross-sections of the two cylinders of radii R1 and R2: the distance "Dist" between the centers of the two circles may then be written as:

$$Dist = (R_1 + R_2)\sqrt{1 + \tan^2\alpha} + \frac{L_1}{\cos\alpha}$$

If R1 tends towards R2, a value of a is obtained as below:

$$\text{if } R_1 \to R_2 \text{ then } \alpha = \arctan\frac{R_2 - R_1}{L_1 + R_1 + R_2} \to 0$$

and, when R1 tends towards R1 the distance Dist is as follows:

$$Dist = (R_1 + R_2)\sqrt{1 + \tan^2\alpha} + \frac{L_1}{\cos\alpha} \to R_1 + R_2 + L_1$$

Provided that the three sides of the triangle are defined in length, the calculation of the angles at the vertices is accessible, whatever the type of triangle formed (rectangle, isosceles, equilateral, or any other).

Taking into Account the Defects of the Calibration Standards

The uncertainties as to the sides of the triangle are easily defined on the basis of the uncertainties that exist concerning the elementary metrological elements constituting the two-dimensional calibration standard.

The defect tolerances associated with the standards are defined in the standard NF EN ISO 3650. These defects come into play either in the calculation of the length correction, or in the calculation of the uncertainty, as is apparent from the comments below.

Alignment of the Cylinders Relative to an Interposed Block.

Figure 5:
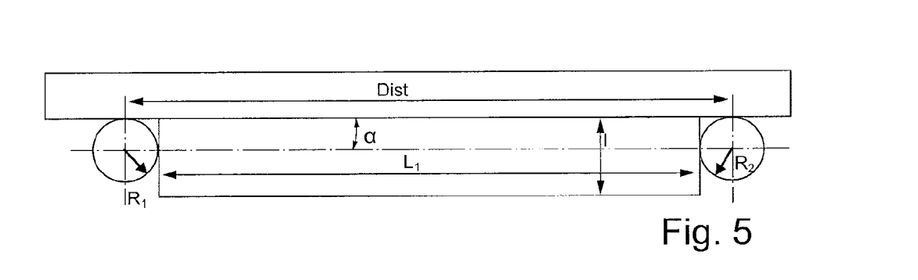
FIG. 5 is a diagram showing the effect, on the configuration of FIG. 4, of the presence of a bearing and alignment ruler alongside a calibration gauge block.

The distance between the centers of two cylinders is theoretically equal to the sum of the length of the calibration gauge block separating them and radii of each of the two cylinders concerned (see above). This definition is only valid if the points of contact on the calibration gauge block are aligned with a perpendicular to the measurement face of the calibration gauge block (that is to say its end face), and if the contact has been ensured. In order to align the cylinders and the calibration gauge block, a granite ruler enables the tangency of the three elements to be ensured; FIG. 5 enables it to be understood that the fact of aligning the block considered along an alignment or bearing ruler (such as the rulers 14A, 14B or 14C while ensuring contact of that ruler with the cylinders has the advantage of reducing the angular discrepancy to close to zero when the radii of the cylinders are equal.

The defect in shape of each block (the end surfaces of each calibration gauge block are considered to be parallel, and perpendicular to the lateral faces) and the uncertainty in those defects also participates in the uncertainty in the length of the triangle side.

Perpendicularity of the Faces of a Calibration Gauge Block

The two measurement faces of a calibration gauge block are considered to be parallel, the parallelism defects being included in the calibrated value (5 points of measurement per face, 5 distances from point to point). The lateral faces, which nevertheless serve to orient the block, have low perpendicularity constraints relative to the measurement faces. This leads to two possible discrepancies in the calculation of center to center distance of two circles, depending on the perpendicularity under study.

Figure 6:
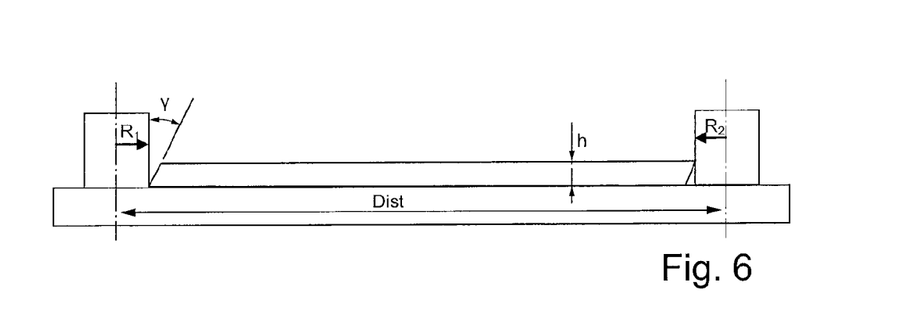
FIG. 6 is a diagram showing the error arising from a defect in perpendicularity (in side view) of the measurement faces of a calibration gauge block relative to the wall of the calibration cylinders.

FIG. 6 is a diagrammatic representation of the case of the end faces of a given block not being exactly parallel to the generatrix of the cylinders with which that block is in contact (γ represents the angular discrepancy between those faces and those walls; it is assumed that the end faces of the calibration gauge block are parallel and have the same discrepancy γ relative to the walls of the cylinders; the distance between the centers of the cylinders is then:

$$Dist = R_1 + R_2 + \frac{L_1}{\cos\gamma} + 8.5 \times \tan\gamma$$

$$\gamma = \arctan\left(\frac{\text{measured defect}}{L_1}\right)$$

By way of example, for a block of 250 mm, $y_{mm}$=5.6×10$^{-4}$ rad; for a perpendicularity defect of 140 μm (max value), the discrepancy in distance caused by that defect may be evaluated at $\Delta_{Dist}$=9.56 μm (the value of 8.5 mm referred to above corresponds to the height of the measurement face of the calibration gauge block (edge radii subtracted)—see the standard NF EN ISO 3650: 1999-03 FIG. 6.

Figure 7:
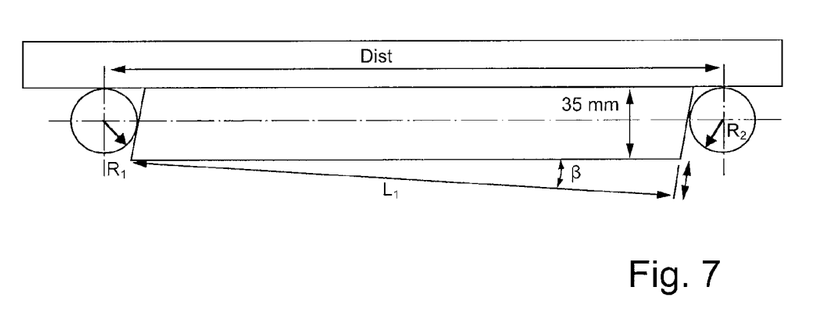
FIG. 7 is a diagram showing the error of a perpendicularity defect (viewed from above) of the measurement faces of a calibration gauge block relative to the adjacent block.

FIG. 7 represents another case in which the end faces of a given block are not exactly perpendicular to a direction linking the centers of the cylinders; more specifically, these faces are tangential here to the wall of the cylinders with which that block is in contact but with an inclination about a direction parallel to the axes of the cylinders; this inclination, identical for both faces, is denoted β (it is assumed, as previously, that the end faces of the calibration gauge block are parallel and have the same discrepancy); the distance "Dist" between the centers of the cylinders is then:

$$Dist = \frac{R_1 + L_1 + R_2}{\cos\beta}$$

$$\beta = \arctan\left(\frac{\text{measured defect}}{L_1}\right)$$

By way of example, for a block of 250 mm $\beta_{max}$=5.6×10$^{-4}$ rad and $$\beta = \arctan\left(\frac{\text{measured defect}}{L_1}\right)$$

(See the standard NF EN ISO 3650: 1999-03, FIG. 6).

Given that the two defects may co-exist, the correction to calculate may be written in the form:

$$Dist = \frac{R_1 + R_2 + \frac{L_1}{\cos\gamma} + 8.5 \times \tan\gamma}{\cos\beta}$$

Figure 8:
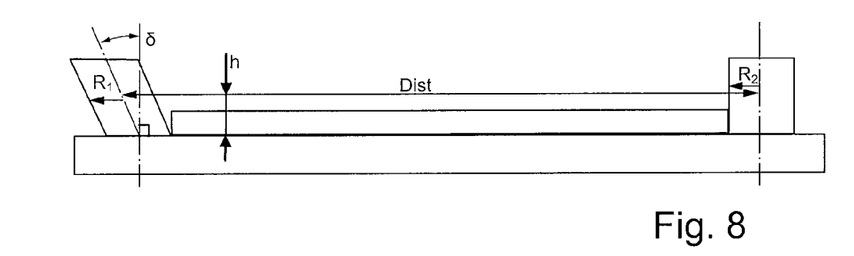
FIG. 8 is a diagram showing the error arising from a defect in perpendicularity (in side view) of the of the wall of the calibration cylinders relative to their flat faces.

Perpendicularity Defect of the Axis of One of the Cylinders Relative to its Base The axis of a calibration cylinder is theoretically perpendicular to the bearing face of the cylinder on the plate. In reality, an angular defect is possible (denoted δ in FIG. 8); In the context of use of the cylinders, this defect generates a possible variation in the center to center distance of two circles measured on the cylinders, directly dependent on the height at which the circle is measured relative to the base. On account of such an error, the distance "Dist" between the centers may be written:

$$Dist = R_1 + h \times \tan\delta + R_2 + L_1$$

$$\delta = \arctan\left(\frac{\text{measured defect}}{\text{height of measurement}}\right)$$

Given the random rotational orientation of the cylinders, the calculated discrepancy in the distance is assimilated to a measurement uncertainty.

Flatness Defect of the Upper Face of the Plate

A flatness defect of the upper surface of the plate where the cylinders bear generates discrepancies in the center to center distance "Dist" of the same type as the above perpendicularity defect. The discrepancy in the distance is considered as being a maximum if the flatness defect is entirely represented between the center of the cylinder and its edge, in particular over a distance equal to the radius. In that case, the angle δ2 must be added to the angle δ in the discrepancy calculation. It also enters into the measurement uncertainty.

$$Dist = R_1 + h \times \tan(\delta + \delta_2) + R_2 + L_1$$

$$\delta_2 = \arctan\left(\frac{\text{measured defect}}{\text{radius of the cylinder}}\right)$$

When the flatness defect acts on the orientation of the block, the calculation is equivalent to the first calculated perpendicularity defect.

Calculation of the Angles

Figure 9:
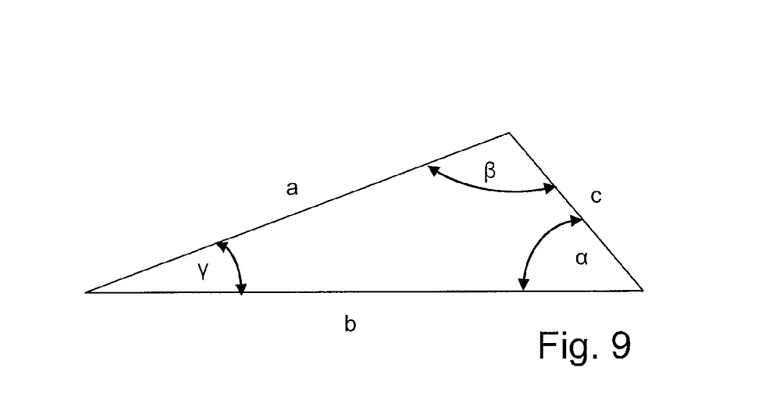
FIG. 9 is simplified diagram of a triangle constituted by a device according to the invention, according to another configuration.

The angles at the vertices are calculated using the formula below (FIG. 9), then by circular permutation. The uncertainty in the angles is obtained by the Monte-Carlo method, by varying each length of side of the triangle in its domain of uncertainty, estimated using the calibration values of the calibration standards and the hypotheses enumerated above.

$$\sin\alpha = \frac{2\sqrt{s(s-a)(s-b)(s-c)}}{bc}$$

with s being the half-perimeter of the triangle:

$$s = \frac{(a+b+c)}{2}$$

The results obtained for the prototype assembly defined above, with cylinders of 41.421 mm (nominal) diameter and height 25 mm, and blocks of width 35 mm, height 9 mm and respective lengths 200 and 300 mm give uncertainties in the lengths of the order of ±3 µm and of the order of ±3" arc for the angles (k=2).

By using identical lengths of standard blocks and cylinders, to produce an isosceles right triangle, it is possible to associate the following lengths and diameters (non-exhaustive, by way of example):

a block of 50 mm, two blocks of 25 mm and 3 cylinders of 35.355 mm.

a block of 200 mm, two blocks of 125 mm and 3 cylinders of 50.066 mm.

The first solution is doubtless the smallest possible way to produce an isosceles right triangle. The prototype produced here is doubles the maximum model that can be produced with conventional block sizes.

When an equilateral triangle is produced, the dimensions of the triangle may be arbitrary, while keeping cylinders of radius comprised between 22.189 mm and 35 mm. The size limitation in this configuration will be the rigidity of the support plate and the mass of the assembly, which must remain easy to manipulate.

Calibration Method for a Measuring Machine Using a Two-Dimensional Calibration Standard.

An example of implementation of the invention is the verification of the geometry of a measuring machine (or of another multi-dimensional measuring instrument); this implementation may consist of measuring a plane, in order to digitally true up the assembly, then of measuring 3 circles parallel to that plane (that is to say circles defined on the wall of the cylinders). It is then possible to define the distances between the centers and the angles between the sides of the triangle formed.

If the mounting is placed horizontally on the machine by aligning one side summarily on a machine axis, this enables verification of the overall trueness of two axes that are perpendicular to each other (for example X and Y of the machine) and the perpendicularity of the axes to each other. By carrying out a second placement of the two-dimensional calibration standard at a different height, an image is obtained of the overall roll defect, of the Z-axis in the present case (N.B.; the roll represents the change in perpendicularity of two axes measured along the third).

The calibration standard of the invention provided may also be placed vertically, which enables the device to be oriented in different measuring planes. Thus, using three operations of placing the standard, all the defects of trueness and perpendicularity of the machine may be verified. With three complementary placements, the values of roll, pitch and yaw are obtained. The time saving for a full check is thus very great, while maintaining a very low level of measurement uncertainties.

The invention claimed is:

1. A two-dimensional metrological calibration standard comprising:
   a plurality of calibration cylinders each having a diameter;
   a plurality of calibration gauge blocks each having a length and a width, each calibration gauge block interposed between two of the plurality of calibration cylinders, such that end faces thereof are in contact with walls of the two calibration cylinders;
   a flat plate,
   wherein the plurality of calibration cylinders and plurality of calibration gauge blocks, as a group, are fastened to the flat plate and conjointly form a triangle, the diameter each cylinder at most equal to twice the width of the calibration gauge blocks in contact therewith; and
   bearing and alignment rulers extending alongside the plurality of calibration gauge blocks and the plurality of calibration cylinders and fastened to the flat plate.

2. The calibration standard according to claim 1, wherein the plurality of calibration cylinders are of equal diameter.

3. The calibration standard according to claim 1, wherein the plurality of calibration gauge blocks have equal widths on a side parallel to the flat plate.

4. The calibration standard according to claim 1, wherein the plurality of calibration cylinders and the plurality of calibration gauge blocks are fastened to the flat plate by clamping members passing through the plurality of calibration cylinders and the plurality of calibration gauge blocks with a clearance space around the clamping members.

5. The calibration standard according to claim 1, wherein the flat plate comprises a triangular shape.

6. The calibration standard according to claim 1, wherein the flat plate further comprises at least one handle.

\* \* \* \* \*